United States Patent
Olsen (10) Patent No.: US 10,286,917 B2
(45) Date of Patent: May 14, 2019

(54) VEHICLE USER IDENTIFICATION USING USER PATTERN DATA

(71) Applicant: VOLVO CAR CORPORATION, Gothenburg (SE)

(72) Inventor: Kee Olsen, Kastrup (DK)

(73) Assignee: Volvo Car Corporation, Gothenburg (SE)

( * ) Notice: Subject to any disclaimer, the term of this patent is extended or adjusted under 35 U.S.C. 154(b) by 37 days.

(21) Appl. No.: 14/923,580

(22) Filed: Oct. 27, 2015

(65) Prior Publication Data

US 2016/0129916 A1 May 12, 2016

(30) Foreign Application Priority Data

Nov. 6, 2014 (EP) .................................. 14192042

(51) Int. Cl.
| | |
|---|---|
| *B60W 50/00* | (2006.01) |
| *H04L 29/08* | (2006.01) |
| *H04W 4/02* | (2018.01) |
| *B60W 40/08* | (2012.01) |

(52) U.S. Cl.
CPC ........ *B60W 50/0098* (2013.01); *B60W 40/08* (2013.01); *H04L 67/12* (2013.01); *H04L 67/306* (2013.01); *H04W 4/027* (2013.01); *B60W 2540/28* (2013.01); *B60W 2710/30* (2013.01)

(58) Field of Classification Search
None
See application file for complete search history.

(56) References Cited

U.S. PATENT DOCUMENTS

| | | | | |
|---|---|---|---|---|
| 9,193,359 | B2* | 11/2015 | Hui | B60R 16/02 |
| 9,224,302 | B1* | 12/2015 | Young | G08G 5/0039 |
| 9,683,859 | B2* | 6/2017 | Kim | G01C 21/3423 |
| 9,728,084 | B2* | 8/2017 | Stenneth | G08G 1/0112 |
| 9,760,702 | B1* | 9/2017 | Kursun | G06F 21/32 |
| 9,780,967 | B2* | 10/2017 | Sargent | H04L 12/66 |
| 9,805,601 | B1* | 10/2017 | Fields | G08G 1/096791 |
| 2003/0109258 | A1* | 6/2003 | Mantyjarvi | A61B 5/11 |
| | | | | 455/440 |
| 2007/0005404 | A1* | 1/2007 | Raz | G06Q 40/00 |
| | | | | 705/4 |
| 2009/0309759 | A1* | 12/2009 | Williams | G08G 1/14 |
| | | | | 340/932.2 |
| 2009/0313109 | A1* | 12/2009 | Bous | G06Q 30/02 |
| | | | | 705/14.31 |

(Continued)

OTHER PUBLICATIONS

Extended European Search Report for European Application No. EP 14192042.1, Completed by the European Patent Office, dated May 19, 2015, 5 Pages.

(Continued)

*Primary Examiner* — Truc M Do (74) *Attorney, Agent, or Firm* — Brooks Kushman P.C.

(57) ABSTRACT

A method performed by a vehicle user identification node is described for enabling configuration of vehicle user settings of a vehicle. The method includes receiving first user pattern data, requesting user identification data based on first user pattern data, receiving the user identification data, and transmitting the user identification data to a vehicle settings node for configuration of vehicle user settings of the vehicle.

18 Claims, 6 Drawing Sheets

(56) References Cited

U.S. PATENT DOCUMENTS

| | | | | |
|---|---|---|---|---|
| 2009/0319221 | A1* | 12/2009 | Kahn | A61B 5/1123 702/141 |
| 2010/0102953 | A1* | 4/2010 | Chou | G08B 21/24 340/539.11 |
| 2010/0304754 | A1 | 12/2010 | Czompo et al. | |
| 2010/0318293 | A1* | 12/2010 | Brush | G01C 21/20 701/431 |
| 2011/0087538 | A1* | 4/2011 | Bous | G06Q 30/02 705/14.34 |
| 2011/0093326 | A1* | 4/2011 | Bous | G06Q 30/02 705/14.38 |
| 2011/0196571 | A1* | 8/2011 | Foladare | G01S 5/0027 701/31.4 |
| 2012/0129460 | A1* | 5/2012 | Hodis | G01S 19/48 455/67.11 |
| 2012/0129544 | A1* | 5/2012 | Hodis | H04W 48/04 455/456.1 |
| 2012/0129545 | A1* | 5/2012 | Hodis | G01S 5/0257 455/456.1 |
| 2013/0024060 | A1* | 1/2013 | Sukkarie | G01C 21/26 701/22 |
| 2013/0054051 | A1* | 2/2013 | Cuddihy | B60R 11/02 701/2 |
| 2013/0060400 | A1* | 3/2013 | Hahne | G08G 1/161 701/1 |
| 2013/0238167 | A1* | 9/2013 | Stanfield | G08G 1/20 701/2 |
| 2013/0297099 | A1* | 11/2013 | Rovik | B60R 16/037 701/2 |
| 2013/0302758 | A1* | 11/2013 | Wright | G07C 5/008 434/65 |
| 2013/0332024 | A1* | 12/2013 | Garrett | G07C 5/008 701/29.4 |
| 2013/0332156 | A1* | 12/2013 | Tackin | H04M 1/6041 704/226 |
| 2014/0210627 | A1* | 7/2014 | Nothacker | G08B 21/02 340/576 |
| 2014/0309862 | A1* | 10/2014 | Ricci | G01C 21/00 701/36 |
| 2015/0091713 | A1* | 4/2015 | Kohlenberg | B60R 25/32 340/426.36 |
| 2015/0155007 | A1* | 6/2015 | Barfield, Jr. | G06T 15/20 386/278 |
| 2015/0170031 | A1* | 6/2015 | Attar | G07C 5/0858 706/46 |
| 2015/0191178 | A1* | 7/2015 | Roy | B60W 40/09 701/36 |
| 2015/0307105 | A1* | 10/2015 | Huber | B60W 50/14 340/576 |
| 2016/0046298 | A1* | 2/2016 | DeRuyck | B60W 40/09 340/576 |

OTHER PUBLICATIONS

Conti et al. Information, Computer and Communications Security Mar. 22, 2011, p. 249-259, XP 058002616, "Mind How You Answer Me!"

* cited by examiner

VEHICLE USER IDENTIFICATION USING USER PATTERN DATA

CROSS-REFERENCE TO RELATED APPLICATIONS

This application claims foreign priority benefits under 35 U.S.C. § 119(a)-(d) to European patent application number EP 14192042.1, filed Nov. 6, 2014, which is incorporated by reference in its entirety.

TECHNICAL FIELD

The present disclosure relates generally to a vehicle user identification node for enabling configuration of vehicle user settings of a vehicle.

BACKGROUND

In prior art it is known to enable configuration of vehicle user settings of a vehicle using a hand held device of a driver or passenger with pre-stored ID data that communicates with the vehicle in a wireless manner. Upon transmitting the data, the vehicle system identifies the driver or passenger and initiates a configuration or adjusting of the vehicle user settings preferred by driver and/or passenger respectively pre-stored in the vehicle.

A drawback with the known art is that it requires a hand-held device to be carried with the driver or passenger before entering the vehicle for user identification. It also requires that user specific ID data is pre-stored in the hand-held device, whereby the hand-held device has to be personal to the specific user. Another drawback is that the preferences of the user have to be pre-stored in the vehicle.

SUMMARY

An object of the present disclosure is to enable a configuration of vehicle user settings, which is more convenient to use for any user of the vehicle.

According to one embodiment a method is provided performed by a vehicle information node for enabling configuration of vehicle settings of a vehicle, the method comprising:
 receiving first user pattern data,
 requesting user identification data based on first user pattern data,
 receiving user identification data,
 transmitting user identification data to a vehicle settings node for configuration of vehicle user settings of the vehicle.

According to another embodiment, the method further comprises determining configuration settings for the vehicle based on the user identification data.

According to another embodiment, the first user pattern data comprises walking pattern data.

According to another embodiment, the first user pattern data comprises first user 3D accelerometer data.

According to another embodiment, user identification data comprises at least one of: specific personal ID data, anonymous ID data, preference data concerning the vehicle settings, first user pattern data, second user pattern data.

According to another embodiment, the first user pattern data further comprises first user gyroscopic sensor data and/or first user barometric height data.

According to another embodiment, the first user pattern data is received from a remote node.

According to another embodiment, the remote node is a hand-held device such as a smartphone, car key or tablet computer.

According to another embodiment, the user identification data is received from a remote node, storing second user pattern data and the user identification data.

According to another embodiment, user identification data is received from an internal database of the vehicle identification node, storing second user pattern data and user identification data.

According to another embodiment, a vehicle user identification node is provided for enabling configuration of a vehicle user settings for a vehicle, the node is arranged to:
 receive first user pattern data by an external remote node communication unit,
 request user identification data based on the first user pattern by a controller
 receive user identification data from an internal database (150) by a vehicle communication unit or a remote node by an external remote node communication unit,
 transmit user identification data to a vehicle setting node for configuration of vehicle user settings of the vehicle.

According to another embodiment, the vehicle identification node is further being arranged to:
 determine configuration settings for the vehicle based on the user identification data.

According to another embodiment, a computer program is provided, comprising computer readable code means, which when run in a connected vehicle driver identification node arranged to enable configuration vehicle user settings of a vehicle causes the connected vehicle driver identification node arranged to enable configuration vehicle user settings of a vehicle to perform the method according to any of the above embodiments.

According to another embodiment, a computer program product is provided, comprising a computer readable medium and a computer program according to the above embodiment, wherein the computer program is stored on the computer readable medium.

According to another embodiment, a vehicle or vessel is provided comprising a vehicle user identification node (100) according to any of the previously described embodiments.

BRIEF DESCRIPTION OF THE DRAWINGS

The disclosure is now described, by way of example, with reference to the accompanying drawings, in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the following, a detailed description will be given. In the drawing figures, like reference numerals designate identical or corresponding elements throughout the several figures. It will be appreciated that these figures are for illustration only and are not in any way restricting the scope of the disclosure.

A vehicle may comprise any type of vehicle including but not limited to a car or a commercial vehicle, truck or lorry.

Figure 1:
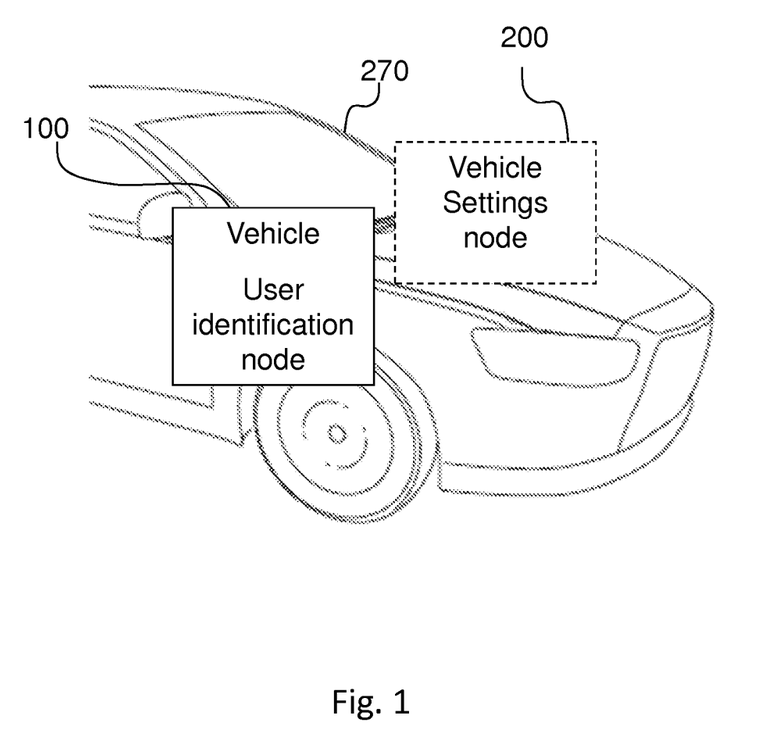
FIG. 1 shows a perspective view of a vehicle comprising a vehicle user identification node according to the disclosure.

FIG. 1 shows a perspective view of a vehicle 270 comprising a vehicle user identification node 100 for enabling configuration of vehicle user settings of a vehicle 270, wherein the vehicle user identification node 100 may comprise one of e.g. the following: a TEM (Telematics Module), a CEM (Central Electronic Module) or an ECU (Electronic Control Module). The vehicle 270 further comprises a vehicle settings node 200 for configuration of the user settings of the vehicle 270, wherein the vehicle settings node 200 may comprise one of e.g. the following: a CEM, ECU.

Figure 2:
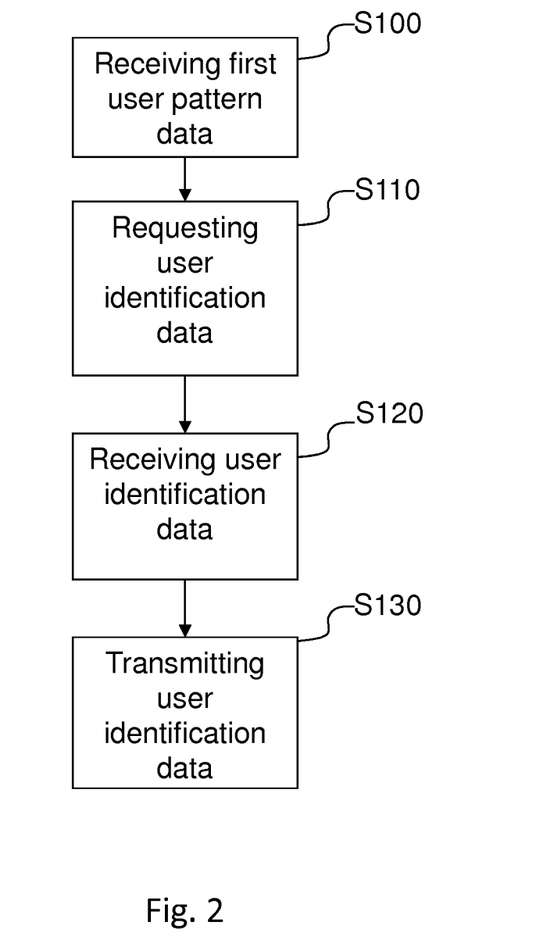
FIG. 2 is a flow chart illustrating a procedure in a vehicle user identification node.
Figure 6:
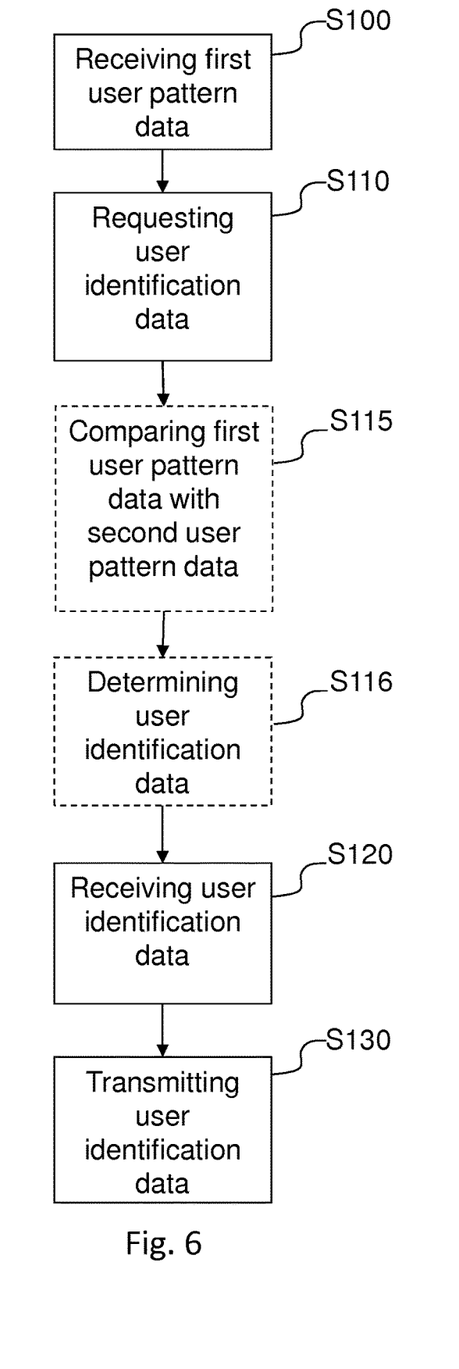
FIG. 6 is a flow chart illustrating a procedure in a vehicle user identification node.

A procedure or method in a vehicle user identification node 100 for enabling configuration of user settings of a vehicle 270, will now be described with reference to FIG. 2. In a first step S100, first user pattern data is received in a vehicle user identification node 100. First user pattern data may for instance be received from a client node 300 wirelessly, via for example WiFi/Wireless Local Area Network (WLAN), Bluetooth, Bluetooth Low Energy (Bluetooth LE), or Bluetooth Smart, Radio Frequency Identification (RFID), ZigBee not limiting to other wireless communication means suitable for short or medium range wireless communication. According to one embodiment, the vehicle user identification node 100 requests first user pattern data from the client node 300. According to one embodiment, the first user pattern data comprises walking pattern data, i.e. gait data of the user equipped with, or by other means carries the client node 300. According to one embodiment, the client node 300 is equipped with a 3-axis or 3D accelerometer for measuring linear acceleration in three dimensions, i.e. along X, Y and Z, enabling measuring or detecting the acceleration, shake, vibration shock or fall of the client node 300. Thus, the client node 300 is adapted to measure 3D accelerometer data. According to one embodiment, the first user pattern data comprises 3D accelerometer data. According to one embodiment, the walking pattern data comprises 3D accelerometer data. According to one embodiment, the client node 300 is equipped with a barometric sensor, i.e. a barometer or pressure sensor for measuring the height position of the client node 300. According to one embodiment, the first user pattern data comprises height data. According to one embodiment, walking pattern data comprises height data. According to one embodiment, the client node 300 is equipped with a gyroscopic sensor that is adapted to detect a 3D or 3-axis angular acceleration around the X, Y, and Z axes, enabling precise calculation of yaw, pitch and roll of the client node 300. According to one embodiment, the first user pattern data comprises gyroscopic data. According to one embodiment walking pattern data comprises gyroscopic data. According to one embodiment, the client node 300 is equipped with at least the 3D accelerometer and the gyroscopic sensor wherein when combined, the data from the 3D accelerometer and the gyroscopic data provides a precise information concerning the movement of the client node 300 in space. The data, alone or when combined, thus enable the recognition and analysis of the walking pattern of the user carrying the client node 300. In a next step S110, the vehicle user identification node 100 requests user identification data based on the first user pattern data. The request may be sent to a remote node 400 or an internal database 150. The vehicle user identification node 100 or the remote node 400 compares or matches the first user pattern data with pre-stored second user pattern data. According to one embodiment, the second user pattern data comprises a first user pattern data, i.e. data that is pre-stored for identification purposes. Thus, according to one embodiment, second user pattern data comprises 3D accelerometer data and/or height data and/or gyroscopic data. According to one embodiment, the second user pattern data may be pre-stored in a memory comprised in a vehicle 270, or in a remote node 400. According to one embodiment, a specific user identification data is assigned to a specific second user pattern data, i.e. each second user pattern data is unique for a specific user which may be identified/determined on the basis of the second user accelerometer data. According to one embodiment, if no match is found between the first and second user pattern data, the first user pattern data may be automatically stored in the memory 150 of the vehicle or the remote node 400 respectively. According to one embodiment, in yet another step S120, the vehicle user identification node 100 receives user identification data based on the comparison and/or matching between first user pattern data and second user pattern data leading to a determination of the user identification data which may have been carried out in the vehicle identification node 100 or a remote node 400. According to one embodiment, the comparison and/or matching between first user pattern data and second user pattern data to determine user identification data, is carried out in an intermediate step between S110 and S120 as described above, i.e. a further step S115 of a procedure or method in a vehicle user identification node 100 for enabling configuration of user settings of a vehicle 270 as seen in FIG. 6. According to one embodiment, in yet a further step S116 the determining of user identification data based on the comparison and/or matching between first user pattern data and second user pattern data is carried out. These steps S115, S116 may be carried out in the user identification node 100 or the remote node 400. According to one embodiment, the user identification data comprises personal data, i.e. a specific personal ID. According to one embodiment, the user identification data comprises preference data concerning the vehicle settings. According to one embodiment, the user identification data comprises first user pattern data if the user has not previously set or programmed any vehicle settings preferences and this is the first time the user uses the vehicle. According to one embodiment, the user identification data comprises second user pattern data wherein the identification is not carried out in full, for instance if the user has not previously set or programmed any vehicle settings preferences, but has previously used the vehicle. Thus, in this case, the identification is carried out solely on the basis of the recognition of the user characteristics, i.e. user pattern data. The vehicle may thus recognize a user without having access to the specific user ID. The vehicle may thus be able to store first user pattern data into second user pattern data as a result of using the vehicle 270. An anonymous ID may be matched with second user data, e.g. person A, B, C, D etc. According to one embodiment, the user is asked to identify himself upon approaching the vehicle 270. The identification request may be sent to the remote node 400 but also presented on a display in the vehicle 270. According to one embodiment, in a further step S130, the vehicle user identification node 100 transmits the user identification data to the vehicle settings node 200 for configuration of vehicle settings. According to one embodiment, the vehicle user settings may comprise essentially any settings of the vehicle that may be personalized for an optimized driving experience, comfort and safety. According to one embodiment, the vehicle settings comprise at least one of seat position, driving wheel position settings, heating or air condition settings, sound system settings, temperature settings, mirror settings, audio settings comprising radio or CD or streaming settings, telephone or handsfree settings, display settings, navigation settings, light settings etc. According to one embodiment, the vehicle user settings node 200 comprises means for storing user settings preferences that may be entered manually by a user or as a result of the actual employed settings by the user of the vehicle. Thus, the vehicle settings node 200 may thus have learning capabilities and adapt and update the preferences of a specific user, so that the latest preferences are always used.

In an embodiment, not shown in the figures, an illustrative procedure may comprise the following steps. A person aiming to enter and use a vehicle either as a driver or passenger appreciates if the vehicle user settings have been adapted according to his preferences already when entering or directly following upon entering the vehicle. To the extent possible, a user may appreciate if the vehicle settings have been adapted to the user pattern or characteristics of the specific user even if he/she has not previously programmed any settings preferences. The driver or passenger, hereinafter referred to as the vehicle user, is equipped with a hand-held device such as e.g. a smartphone, tablet or other portable device equipped with a wireless communication functionality such as for example WiFi/Wireless Local Area Network (WLAN), Bluetooth, Bluetooth Low Energy (Bluetooth LE), or Bluetooth Smart, Radio Frequency Identification (RFID), ZigBee not limiting to other wireless communication means suitable for short or medium range wireless communication. The hand-held device may be carried in for example the vehicle users hand, pocket or bag. The hand-held device is further equipped with a 3D accelerometer for measuring acceleration in three dimensions. The hand-held device may further be equipped with a gyroscopic sensor for defining the angular acceleration and orientation of the hand-held device. The hand-held device may further be equipped with an air pressure sensing device such as a barometer/barometric sensor for measuring the height/air pressure of the hand-held device. According to one embodiment, the hand-held device is a car key, or a smart car-key, or smart-key, equipped with the above technical functions. As the vehicle user approaches the vehicle a wireless connection is established between the hand-held device and the vehicle identification node 100. According to one embodiment, the hand-held device continuously advertises its presence via the wireless communication functionality and the vehicle scans for slave devices within a certain range around the vehicle depending on the type of wireless communication. Upon detection of the hand-held device by the vehicle a connection might be established if a pairing of the hand-held device has taken place previously or upon a request and confirmation by the vehicle user by for instance typing a connection password in the hand-held device. Following the establishing of a connection between the hand-held device and the vehicle, a vehicle identification node 100 requests first user pattern data from the hand-held device which initiates a user pattern recording by using the built-in 3D accelerometer in the hand-held device and possibly also the gyroscopic sensor and/or the barometric sensor in the hand-held device. According to one embodiment, the first user pattern data comprises walking pattern data. According to one embodiment, the 3D acceleration data is represented as vectors having a direction and magnitude which are collected with a fixed but adjustable sample rate, and stored to create a pair-wise repeated pattern for each step, i.e. right step and left step respectively, carried out by the vehicle user as he/she is approaching the vehicle. The first user pattern data is then transferred from the hand-held device to the vehicle identification node 100, which receives the first user pattern data. The vehicle user identification node 100 thereafter requests user identification data based on the first user pattern data. Thereafter, the vehicle user identification node 100 or a remote node 400 compares, i.e. matches the received first user pattern data with pre-stored second user pattern data to which a specific user has been assigned. The second user pattern data is pre-stored in an internal database 150 in the vehicle or in a remote node 400, such as an external database. The second user pattern data which relates to a specific user has a certain tolerance to take into account and compensate for differences in walking pattern for a user originating from e.g. type of shoes used, injuries, walking surface, etc. Based on the comparison step, the vehicle user identification node 100 receives user identification data, i.e. the specific user that is approaching the vehicle. In the case that no second user pattern data matches the first user pattern data, the vehicle identification node may initiate the storing of an anonymous user A in connection to the second user pattern data, either in the remote node 400 or in the database 150 in the vehicle 270. The user may be asked to identify himself or herself via the remote node 400 or by the vehicle identification node 200 in the vehicle 270 after entering the same. The next time the user approaches the vehicle 270 he/she may be recognized either as a specific verified person or as the anonymous person A. Since such user has employed certain settings in the vehicle during the first time use, the vehicle settings node 200 can initiate the latest used settings accordingly. The gyroscopic data and/or the barometric height sensor data may further enhance the first user pattern data to enable a more reliable and fast user identification step, since some differentiation can for instance be carried out already in determining the height in which the hand-held device is carried. The vehicle user identification node 100 then transmits the user identification data to a vehicle settings node 200 for the configuration of vehicle settings of the vehicle 270. The user identification data may thus comprise any of verified user information, i.e. user ID data, anonymous user ID data, first user pattern data, second user pattern data, user preference data together with user ID data. If a user uses the vehicle 270 for the first time and has not entered or pre-programmed any preferences, the vehicle identification node may still transmit the first user data which can be interpreted by the vehicle settings node into assumed preferred settings. For instance, the first user pattern data comprises information that may be translated into an assumed and likely length of the driver, whereby the seat position settings is adjusted accordingly. Thus, to a certain level, the vehicle settings node 200 may use first user pattern data to configure the vehicle user settings. According to one embodiment, the vehicle settings node 200 comprises pre-stored information concerning the personal preferences of the settings of the vehicle 270. Such preferences may comprise the seat position, ventilation, air condition, temperature settings, mirror settings, preferred radio stations, or audio including specific music or podcasts or audio books to be streamed or by other means played in connection to entering the vehicle. Other preferences may include certain themes in the vehicle, display settings, light settings, navigation settings etc. In the case that more than one vehicle user approaches the vehicle 270, the possibility to measure signal strength of the signals transmitted from the hand-held device and the vehicle 270 may be used. For instance, with Bluetooth LE, it is possible to measure signal strength. The signal strength may thereby be interpreted as a measure of distance. By placing a Bluetooth LE antenna at several strategic positions in the vehicle 270, for instance at each corner of the vehicle 270 the identification of which hand-held device and thereby user is closest to a specific corner and hence, a seat in the vehicle 270, is enabled. Which hand-held device that belongs to the driver may thus be determined whereby the correct settings may be configured according to the described process above. According to one embodiment, configuration of vehicle settings may be carried out for more than one vehicle user simultaneously as the vehicle may be divided into specific climate zones concerning for instance ventilation and temperature. Each driver naturally uses his own seat which may be adjusted according to personal preferences.

Figure 3:
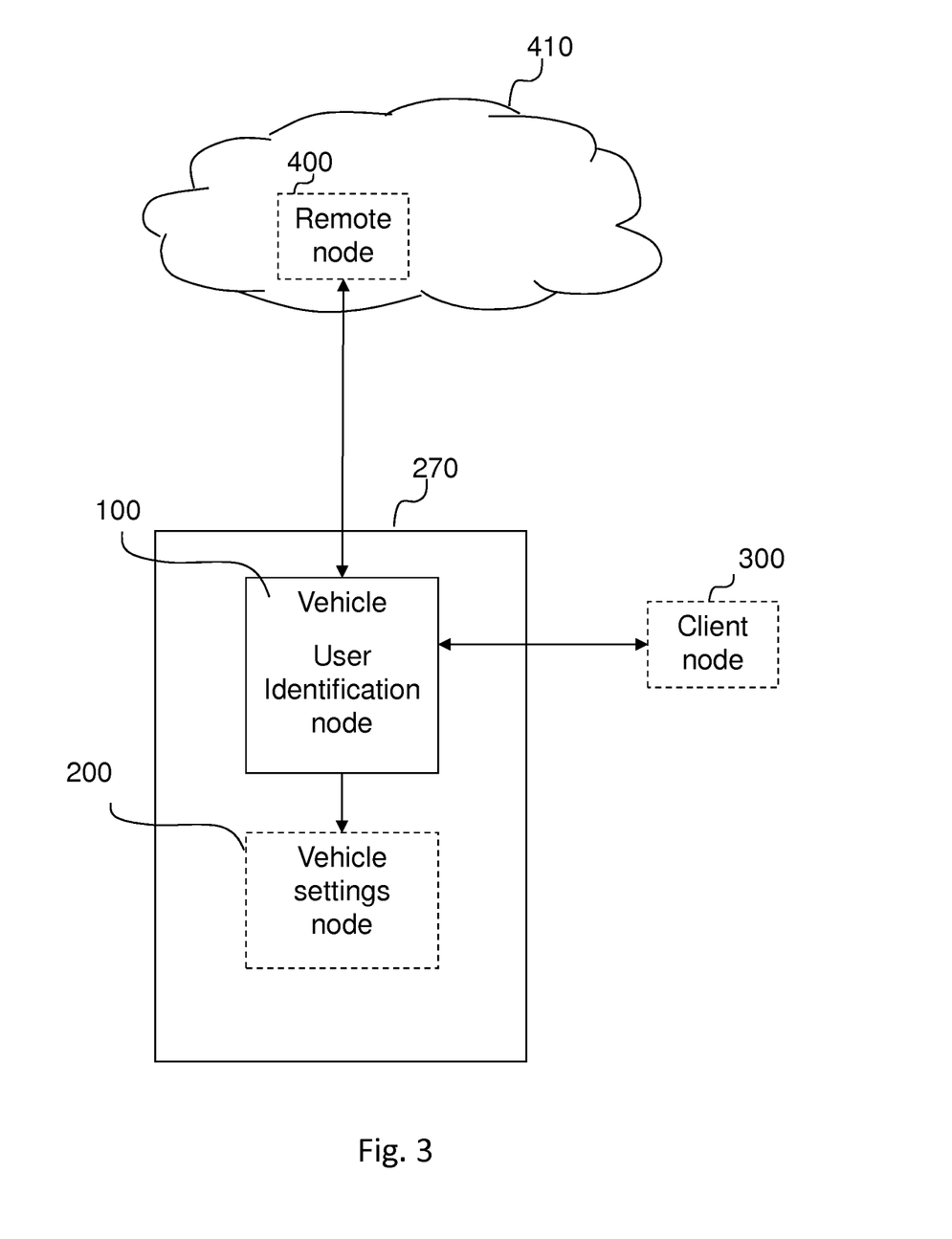
FIG. 3 is a block diagram illustrating embodiments of a settings configuration solution.

FIG. 3 shows an illustration of embodiments with the vehicle user identification node 100, vehicle settings node 200, a computer environment 410 comprising a remote node 400.

The remote node 400 may be arranged in the computer environment 410. Examples of computer environments are, network connected computer, application server, web server, data facility, computer cloud, hosting service, not limiting the term computer environment to other suitable terms for a computer environment 410. The computer environment 410 may be arranged such that the remote node 400 may be enabled to communicate with vehicle user identification node 100. The communication may be performed over the public Internet, or a virtual private network over the Internet, or a closed TCP/IP-network, carried by GSM/GPRS (Global System for Mobile Communications/General Packet Radio Service), 3G (third generation of mobile telecommunications technology), LTE (Long term Evolution), WLAN, Satellite, or an operator/service provider specific network for information services, not limiting the solution to use other types of networks.

Upon establishing a connection of the client node 300 to the vehicle 270, i.e. vehicle user identification node 100, first user pattern data is transmitted by wire or wirelessly. The vehicle user identification node 100 requests second user pattern data concerning the vehicle user based on the first user pattern data from an internal database 150, the remote node 400. The first user pattern data, corresponding to unique characteristics of a vehicle user approaching the vehicle is compared/matched with a pre-stored, second user pattern data stored in the remote node 400 or the internal database 150. According to one embodiment, second user pattern data is stored in the internal database 150 and/or the remote node 400. The vehicle user identification node 100 transmits user identification data to the vehicle settings node 200 for configuration of the vehicle settings of the vehicle 270.

According to one embodiment, the remote node 400 is a server/database accessible via the web, whereby a user may update his user settings preferences as well as registering his/her user pattern data by the aid of a hand-held device. This may be preferred prior to using a new vehicle, such as for instance a bought or rented car.

Figure 4:
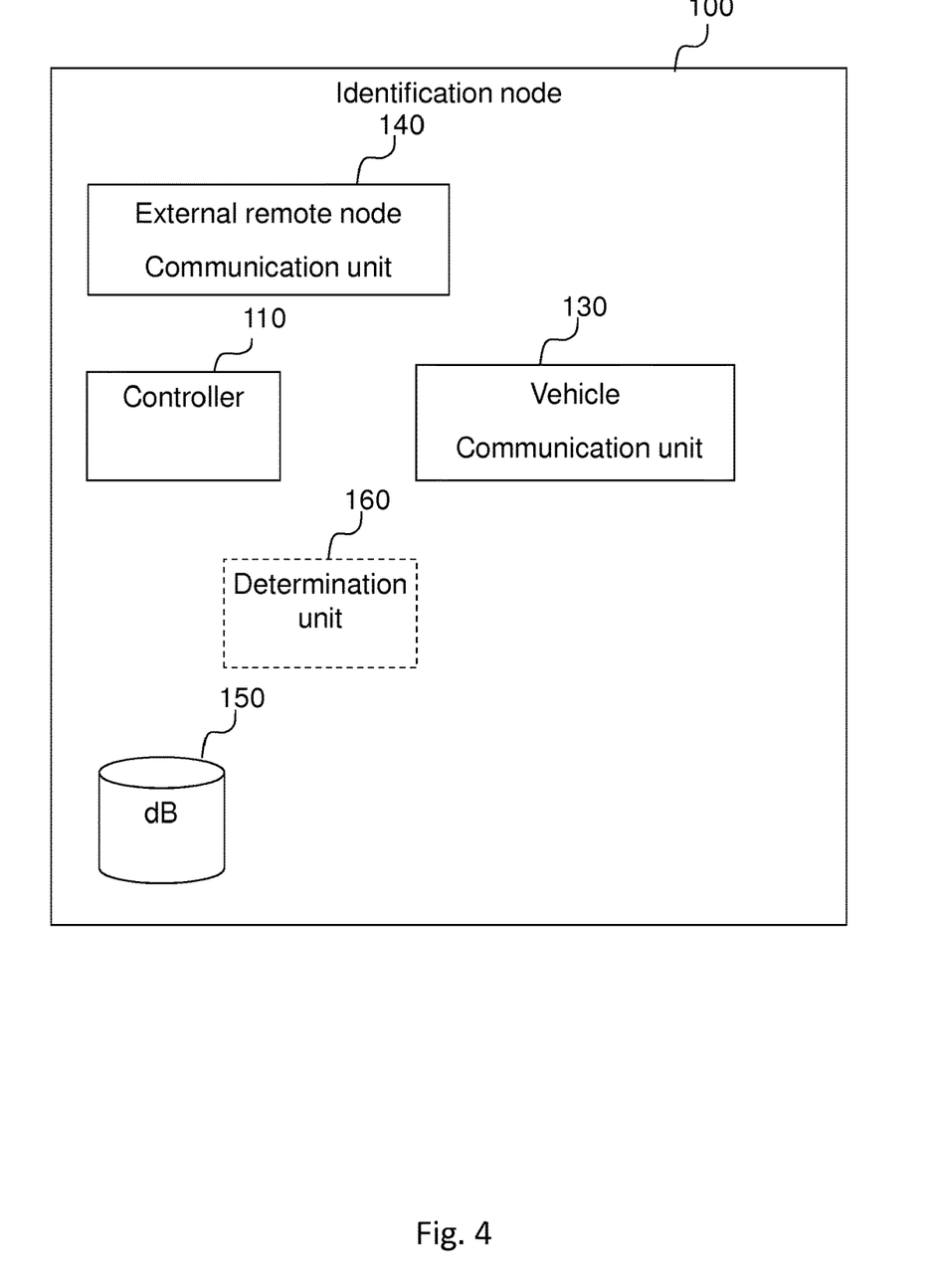
FIG. 4 illustrates example embodiments of a vehicle identification node.

FIG. 4 discloses a vehicle user identification node 100 for enabling configuration of the vehicle settings of the vehicle 270. The node 100 is arranged to receive first user pattern data concerning the vehicle user by a vehicle communication unit 130. A controller 110 is thereafter arranged to request user identification data based on the first user pattern data. A vehicle communication unit 140, and an external remote node communication unit 140 respectively is arranged to receive user identification data from a remote node 400 or an internal database 150 respectively. According to one embodiment, the controller 110 is arranged to compare first user pattern data with second user pattern data. The node 100 is further being arranged to determine user identification data, i.e. the specific user known through the second user pattern data that matches the first user pattern data in a determination unit 160. The node 100 is further being arranged to transmit user identification data to a vehicle user settings node 200 for configuration of the vehicle settings of the vehicle 270. According to one embodiment, the comparing/matching of the first user pattern data and the second user pattern data for the determination of user identification data is carried out in the remote node 400. The user identification data may be transmitted by the vehicle communication unit 130. The node may further be arranged to determine user characteristics for the vehicle user based on the received first user pattern data in a determination unit 160. The determination of user characteristics may be performed by the controller 110. The user characteristics may than be transmitted by the vehicle communication unit 130 to the vehicle user settings node 200.

Figure 5:
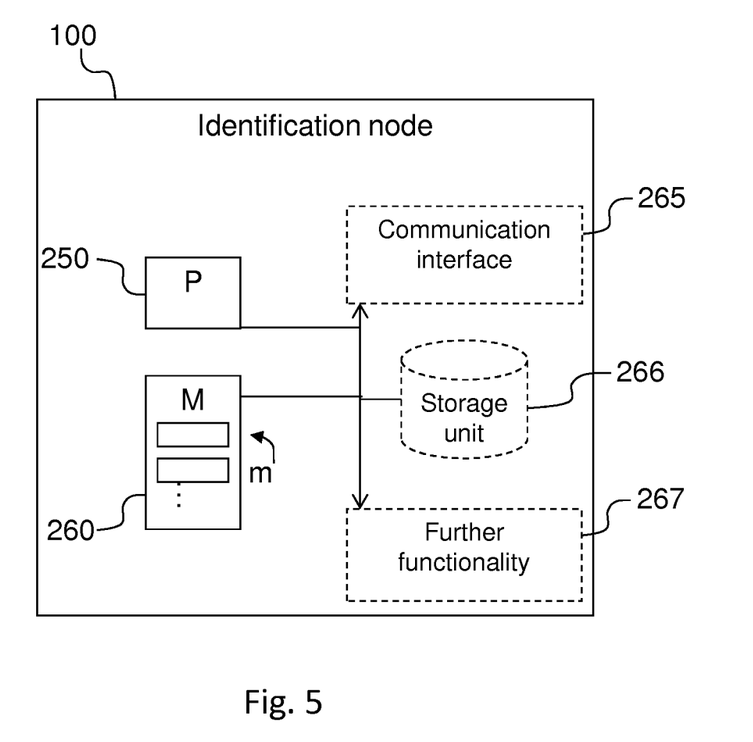
FIG. 5 shows an illustration of embodiments of a vehicle identification node.

FIG. 5 shows an illustration of embodiments of a vehicle user identification node 100. The vehicle user identification node 100 may be implemented, by means of program modules of a respective computer program comprising code which, when run by a processing unit 250, causes the vehicle user identification node 100 to perform the actions, functions and/or operations described herein. The processing unit 250 may comprise a single Central Processing Unit (CPU), or could comprise two or more processing units. For example, the processing unit 250 may include general purpose microprocessors, instruction set processors and/or related chips sets and/or special purpose microprocessors such as Application Specific Integrated Circuits (ASICs). The processing unit 250 may also comprise a memory or storage for caching and other purposes. Those of ordinary skill in the art understand that any other node, controller, unit, database and/or device described herein may be similarly implemented.

Each computer program may be carried by a computer program product 260 in the vehicle user identification node 100, shown in FIG. 1, 2, 4, 5, et al, in the form of a memory having a computer readable medium and being connected to the processing unit 250. The computer program product 260 or memory thus comprises a computer readable medium on which the computer program is stored e.g. in the form of computer program modules "m". For example, the memory 260 may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the vehicle user identification node 100.

The vehicle user identification node 100 may further comprise a communication interface 265. The communication interface 265 may be arranged to communicate with for example the vehicle user settings node 200, or remote node 400. In an embodiment the communication interface 265 may comprise chip set adopted for communication via CAN bus (Controller Area Network) or communication adopted to ISO 11898. Other examples of standards which may be supported by the communication interface 265 are: ZigBee, Bluetooth, RFID (Radio frequency identification), USB (Universal serial bus), or IEEE 802.11 (Institute of Electrical and Electronics Engineers), including but not limited to 802.11a/b/n or other similar forthcoming standards. The communication interface 265 may comprise an antenna. The communication interface 265 may be connectable to an external antenna. The vehicle user identification node 100 may further comprise one or more storage units 266 and further functionality 267 useful for the vehicle user identification node 100 to serve its purpose as vehicle user identification node, such as power supply, internal communications bus, internal cooling, database engine, operating system, not limiting to other functionalities.

Embodiments of vehicle user identification node according to the disclosure have been described. However, the person skilled in the art realizes that this can be varied within the scope of the appended claims without departing from the inventive idea.

All the described alternative embodiments above or parts of an embodiment can be freely combined without departing from the inventive idea as long as the combination is not contradictory.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method performed by a vehicle user identification node comprising a processor for enabling configuration of vehicle user settings of a vehicle, the method comprising:
   receiving from a remote client node via an external remote node communication unit first user pattern data, wherein the first user pattern data comprises first user height data from a barometric or air pressure sensor and first user walking pattern data;
   requesting user identification data based on the first user pattern data from a remote node via the external remote node communication unit or from an internal database via a vehicle communication unit;
   receiving the user identification data from the remote node via the external remote node communication unit or the internal database via the vehicle communication unit, wherein the user identification data comprises the first user pattern data; and
   transmitting the user identification data over a vehicle network to a vehicle settings node configured to use the user identification data to configure vehicle user settings of the vehicle.

2. The method according to claim 1 further comprising:
   determining configuration settings for the vehicle based on the user identification data.

3. The method according to claim 1 wherein the first user pattern data comprises first user 3D accelerometer data.

4. The method according to claim 1 wherein user identification data comprises at least one of specific personal ID data, anonymous ID data, preference data concerning the vehicle settings, and second user pattern data.

5. The method according to claim 1 wherein the first user pattern data further comprises first user gyroscopic sensor data.

6. The method according to claim 1 wherein the first user pattern data is received from the remote client node via a short or medium range wireless communication.

7. The method according to claim 1 wherein the remote client node is a hand-held device such as a smartphone, car key or tablet computer.

8. The method according to claim 1 wherein the user identification data is received from the remote node storing second user pattern data and the user identification data.

9. The method according to claim 1 wherein user identification data is received from the internal database of the vehicle user identification node storing second user pattern data and user identification data.

10. A vehicle user identification node for enabling configuration of vehicle user settings of a vehicle, the vehicle user identification node comprising a processer and configured to:
    receive first user pattern data from a remote client node via an external remote node communication unit, wherein the first user pattern data comprises first user height data from a barometric or air pressure sensor and first user walking pattern data;
    request user identification data based on the first user pattern data from an internal database via a vehicle communication unit or from another remote node via the external remote node communication unit;
    receive the user identification data from the internal database via the vehicle communication unit or from the another remote node via the external remote node communication unit; and
    transmit the user identification data over a vehicle network to a vehicle setting node configured to use the user identification data to configure vehicle user settings of the vehicle, wherein the user identification data comprises the first user pattern data.

11. The vehicle user identification node according to claim 10 further configured to determine configuration settings for the vehicle based on the user identification data.

12. A non-transitory computer readable medium having stored computer executable instructions which, when executed in a vehicle user identification node comprising a processor and arranged to enable configuration of vehicle user settings of a vehicle, cause the vehicle user identification node to:
    receive first user pattern data from an external remote client node via an external remote node communication unit, wherein the first user pattern data comprises first user height data from a barometric or air pressure sensor and first user walking pattern data;
    request user identification data based on the first user pattern data from an internal database via a vehicle communication unit or from another remote node via the external remote node communication unit;
    receive the user identification data from the internal database via the vehicle communication unit or from the another remote node via the external remote node communication unit; and
    transmit the user identification data over a vehicle network to a vehicle setting node configured to use the user identification data to configure vehicle user settings of the vehicle, wherein the user identification data comprises the first user pattern data.

13. A vehicle comprising a vehicle user identification node according to claim 10.

14. A vessel comprising a vehicle user identification node according to claim 10.

15. The method of claim 1 wherein the user identification data comprising the first user walking pattern data represents assumed user settings.

16. The vehicle user identification node of claim 10 wherein the user identification data comprising the first user walking pattern data represents assumed user settings.

17. A system comprising the vehicle user identification node of claim 10, the system further comprising a vehicle settings node configured to interpret, in an absence of pre-stored settings associated with the user, the user identification data comprising the first user walking pattern data received from the vehicle user identification node into assumed user settings.

18. The computer readable medium of claim 12 wherein the user identification data comprising the first user walking pattern data represents assumed user settings.

\* \* \* \* \*